United States Patent
Park et al.

(10) Patent No.: US 10,483,548 B2
(45) Date of Patent: Nov. 19, 2019

(54) ELECTRON COLLECTOR STRUCTURE AND LITHIUM BATTERY CONTAINING THE SAME

(71) Applicant: Samsung SDI Co., Ltd., Yongin-si, Gyeonggi-do (KR)

(72) Inventors: Han-Eol Park, Yongin-si (KR); Seon-Young Kwon, Yongin-si (KR); Do-Hyung Park, Yongin-si (KR); Jong-Seo Choi, Yongin-si (KR); Ji-Hyun Kim, Yongin-si (KR); Min-Han Kim, Yongin-si (KR); Joong-Ho Moon, Yongin-si (KR); Kyoung-Hyun Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 214 days.

(21) Appl. No.: 14/301,136

(22) Filed: Jun. 10, 2014

(65) Prior Publication Data

US 2015/0024270 A1    Jan. 22, 2015

(30) Foreign Application Priority Data

Jul. 16, 2013 (KR) .................. 10-2013-0083570

(51) Int. Cl.
*H01M 4/66* (2006.01)
*H01M 4/70* (2006.01)
(Continued)

(52) U.S. Cl.
CPC .......... *H01M 4/667* (2013.01); *H01M 4/663* (2013.01); *H01M 4/70* (2013.01); *H01M 4/131* (2013.01); *H01M 4/662* (2013.01); *H01M 10/052* (2013.01)

(58) Field of Classification Search
CPC ........ H01M 4/667; H01M 4/663; H01M 4/70; H01M 4/131; H01M 10/052
(Continued)

(56) References Cited

U.S. PATENT DOCUMENTS

| 2009/0324897 A1* | 12/2009 | Choi | .................. B81C 1/00031 428/195.1 |
| 2012/0244430 A1* | 9/2012 | Yamazaki | ............. H01M 4/131 429/211 |

(Continued)

FOREIGN PATENT DOCUMENTS

| JP | H11-73947 | * | 3/1999 | ............. H01M 4/02 |
| KR | 10-2010-0098157 A | | 9/2010 | |

(Continued)

OTHER PUBLICATIONS

Fujii. JP H11-73947. Mar. 16, 1999. English machine translation by JPO.*

(Continued)

*Primary Examiner* — James Lee
(74) *Attorney, Agent, or Firm* — Knobbe, Martens, Olson & Bear, LLP

(57) ABSTRACT

An electron collector structure and a lithium battery including the same are disclosed. The electron collector structure includes a conductive thin film; and a graphene layer that is coated on the surface of the conductive thin film and may improve the electrical conductivity of an electrode plate. As an electrode of the lithium battery includes the electron collector structure, the electrical conductivity of the electrode may be increased so that the energy consumption properties as well as the lifespan characteristics of the lithium battery may be also improved.

15 Claims, 4 Drawing Sheets

(51) Int. Cl.
*H01M 4/131* (2010.01)
*H01M 10/052* (2010.01)

(58) Field of Classification Search
USPC ............ 429/221, 245, 241, 231.3, 223, 224,
429/231.95
See application file for complete search history.

(56) References Cited

U.S. PATENT DOCUMENTS

| | | | |
|---|---|---|---|
| 2012/0321945 A1* | 12/2012 | Park | H01M 4/0414 429/211 |
| 2013/0011732 A1* | 1/2013 | Kim | H01M 4/663 429/211 |
| 2013/0022872 A1 | 1/2013 | Noh et al. | |

FOREIGN PATENT DOCUMENTS

| | | | | |
|---|---|---|---|---|
| KR | 10-2011-0029321 A | 3/2011 | | |
| KR | 10-2011-0049471 A | 5/2011 | | |
| KR | 10-2011-0081107 A | 7/2011 | | |
| KR | 10-1199177 | * 11/2012 | .............. | H01M 4/02 |

OTHER PUBLICATIONS

Prabakar et al., "Graphene oxide as a corrosion inhibitor for the aluminum current collector in lithium ion batteries," *Carbon 52* (2013) 128-136.
Korean Office Action dated Aug. 7, 2019 for Korean Application No. KR 10-2013-0083570, which cites the above-identified reference No. 1, and from which subject U.S. Appl. No. 14/301,136 claims priority.

* cited by examiner

ELECTRON COLLECTOR STRUCTURE AND LITHIUM BATTERY CONTAINING THE SAME

RELATED APPLICATION

Any and all priority claims identified in the Application Data Sheet, or any correction thereto, are hereby incorporated by reference under 37 CFR 1.57. For example, this application claims the benefit of Korean Patent Application No. 10-2013-0083570 in the Korean Intellectual Property Office on Jul. 16, 2013, the disclosure of which is incorporated herein by reference in its entirety.

BACKGROUND

Field

This invention relates to an electron collector structure and a lithium battery including the same.

Description of the Related Technology

Lithium secondary batteries generate electric energy by oxidation and reduction reactions that occur when lithium ions intercalated into and deintercalated from a positive electrode and a negative electrode. Each of the positive and negative electrodes includes an active material that enables intercalation and deintercalation of lithium ions. This active materials on the electrode react with an organic electrolytic solution or a polymer electrolytic solution between the positive electrode and the negative electrode.

The positive active materials for the lithium secondary batteries can be selected from compounds having a structure that enables intercalation of lithium ions such as lithium cobalt oxides ($LiCoO_2$), lithium nickel oxides ($LiNiO_2$), lithium nickel cobalt manganese oxides ($Li[Ni_1-x-yCo_xM_y]O_2$), or $LiFePO_4$ or $LiMnPO_4$ having an olivine structure. However, when a positive active material other than $LiCoO_2$ is used, the electrical conductivities thereof are inferior than that of $LiCoO_2$. Particularly, $LiFePO_4$ and $LiMnPO_4$ with an olivine structure have even reduced electrical conductivity.

Accordingly, research has been actively conducted to improve the electrical conductivities of positive electrode plates including positive active materials that do not have good electrical conductivities.

SUMMARY

One aspect of the disclosure includes an electron collector structure that may increase the electrical conductivity of an electrode plate.

Another aspect of the disclosure includes an electrode for a lithium battery having an electron collector structure.

Another aspect of the disclosure includes a lithium battery having an electron collector structure.

In some embodiments, an electron collector structure includes a conductive thin film; and a graphene layer coated on at least one surface of the conductive thin film.

In some embodiments, the graphene layer of the electron collector structure is coated on an area of about 50% or less of the entire area of the conductive thin film. The graphene layer of the electron collector structure is coated on an area in the range of from about 10% to about 50% of the entire area of the conductive thin film.

In some embodiments, the graphene layer of the electron collector structure has a regular arrangement of a checkered pattern, a plaid pattern, a circular pattern, or a polygonal pattern.

In some embodiments, the graphene layer of the electron collector structure has a thickness of about 200 nm or less. In some embodiments, a thickness of the graphene layer is about 1 nm to about 500 nm.

In some embodiments, the conductive thin film of the electron collector structure includes at least one of aluminum, copper, nickel, titanium, and stainless steel.

In some embodiments, the conductive thin film of the electron collector structure has at least one form of a film, a sheet, a foil, a net, a porous body, foam, and a non-woven fabric.

In some embodiments, a surface of the conductive thin film has an uneven structure.

In some embodiments, an electrode for a lithium battery includes the above-described electron collector structure; and an electrode active material layer disposed on the graphene layer.

In some embodiments, the electrode is a positive electrode, and the active material layer includes at least one positive active material selected from the group consisting of $LiCoO_2$, $LiNiO_2$, $LiMnO_2$, $LiMn_2O_4$, $Li(Ni_aCo_bMn_c)O_2$, wherein $0<a<1$, $0<b<1$, $0<c<1$, and $a+b+c=1$, $LiNi_1-YCo_YO_2$, $LiCo_1-YMn_YO_2$, $LiNi_1-YMn_YO_2$, wherein $0≤Y<1$, $Li(Ni_aCo_bMn_c)O_4$, wherein $0<a<2$, $0<b<2$, $0<c<2$, and $a+b+c=2$, $LiMn_{2-z}Ni_zO_4$, $LiMn_{2-z}Co_zO_4$, wherein $0<Z<2$, $LiCoPO_4$, and $LiFePO_4$.

In some embodiments, a lithium battery includes a positive electrode; a negative electrode disposed opposite to the positive electrode; and an electrolyte disposed between the positive electrode and the negative electrode, wherein at least one of the positive electrode and the negative electrode includes the above-described electron collector structure.

Additional aspects will be set forth in part in the description which follows and, in part, will be apparent from the description, or may be learned by practice of the presented embodiments

DETAILED DESCRIPTION OF CERTAIN INVENTIVE EMBODIMENTS

Figure 1A:
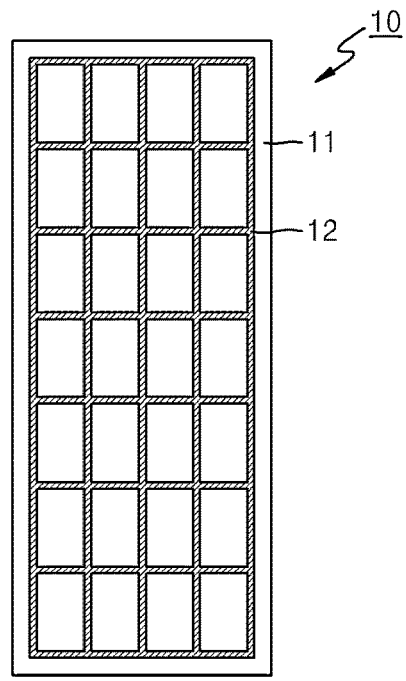
FIGS. 1A and 1B illustrate exemplary pattern shapes of a graphene layer in an electron collector structure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

In some embodiments, an electron collector structure according to an embodiment may include a conductive thin film and a graphene layer coated on at least one surface of the conductive thin film.

Figure 1B:
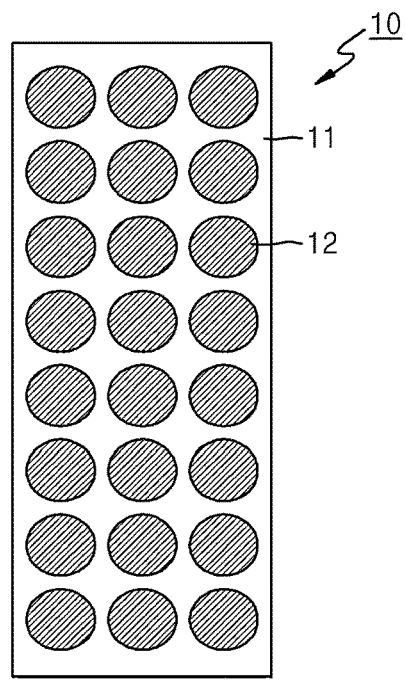

FIG. 1A schematically illustrates an electron collector structure. Referring to FIG. 1A, the electron collector structure 10 has a graphene layer 12 coated on one surface of a conductive thin film 11. The pattern shape of the graphene layer 12 illustrated in FIG. 1 is only one example, and the pattern shape is not particularly limited thereto. For example, an arrangement pattern of the graphene layer 12 may have a checkered pattern, a stripe pattern, a plaid pattern, a circular pattern, or a polygonal pattern such as triangular, rectangular, rhombus, or hexagonal pattern. For example, when the graphene layer 12 is arranged in a circular pattern, the graphene layer 12 may have a shape as illustrated in FIG. 1B.

Figure 2:
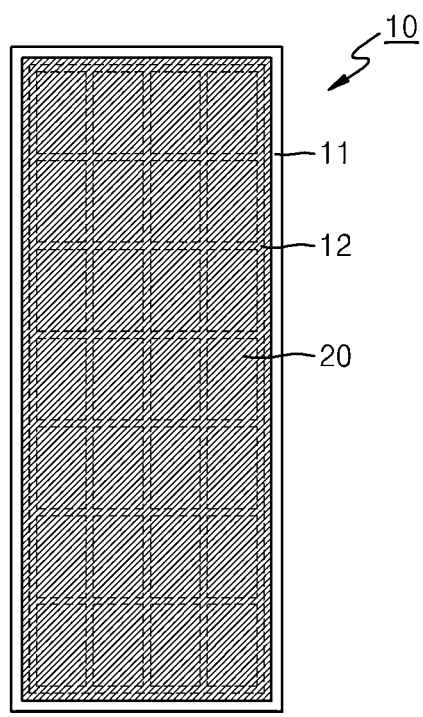
FIG. 2 is a schematic view of an electrode structure.

As illustrated in FIG. 2, the electrode active material layer 20 may be disposed on the electron collector structure 10 including the conductive thin film 11 coated with the graphene layer 12 in order to be used as an electrode for a battery.

The conductive thin film 11 is not particularly limited and may be any structure that has high conductivity and does not induce chemical changes to the battery. For example, the conductive thin film 11 may be formed of at least one material selected from the group consisting of aluminum, copper, nickel, titanium, stainless steel, and any combinations thereof. In order to be used as a conductive thin film 11, surfaces of the material may be treated with a coating material such as nickel, copper, aluminum, titanium, gold, silver, platinum, or palladium by using electroplating or ion deposition. In some embodiments, nanoparticles of the coating material may be coated on the surface of the main material by using a dipping method or compression.

The conductive thin film 11 may have a slightly uneven structure formed on the surface thereof. The uneven structure may increase a bonding strength between the conductive thin film 11 and the graphene layer 12 to be coated on the conductive thin film 11.

The conductive thin film 11 may be formed in various forms such as a film, a sheet, a foil, a net, a porous body, a foam, or a non-woven fabric.

The graphene layer 12 is coated on at least one surface of the conductive thin film 11. Graphene is a compound that has carbon atoms bonded in a hexagonal structure to form a beehive shape. A graphene layer has a 2-dimensional sheet structure and high electrical conductivity and thermal conductivity in 2 horizontal directions. By inserting the graphene layer 12 between the conductive thin film 11 and the electrode active material layer 20, the electrical conductivity and 2-dimensional transfer characteristics that are already good may be further increased to get even higher electrical conductivity of the electrode plate. The graphene layer 12 is not only capable of transmitting electrons, but also capable of optionally transmitting ions such as lithium ions.

In some embodiments, the graphene layer 12 is not coated on the entire area of the conductive thin film 11, but is coated on an area of about 50% or less of the entire area of the conductive thin film 11. In other words, when the graphene layer 12 is coated on an area of more than about 50% of the entire area of the conductive thin film 11, the bonding strength between the graphene layer 12 and the electrode active material layer 20 decreases, which causes a poor coating state of the electrode active material layer 20. Accordingly, an electrode with a poor coating state of the electrode active material layer 20 can be formed due to the formation of bubbles or the like between the graphene layer 12 and the electrode active material layer 20. When such an electrode is used through winding and pressing processes, stability problems such as a short circuit may occur in a lithium battery.

The graphene layer 12 may be, for example, coated on an area in the range of from about 10% to about 50% of the entire area of the conductive thin film 11, and in greater detail, coated on an area in the range of about 15% to about 50%, or about 20% to about 40% of the entire area of the conductive thin film 11.

The pattern in which the graphene layer 12 is coated is not particularly limited, and the pattern may be continuously or discontinuously coated on the conductive thin film 11. Empty spaces are formed between the areas where the graphene layer 12 is coated in a uniform pattern, and the conductive thin film 11 exposed through the empty spaces may directly contact the electrode active material layer that will be disposed on the graphene layer 12 later.

The arrangement pattern of the graphene layer 12 is not particularly limited, and may be, for example, a checkered pattern, a plaid pattern, a circular pattern, or a polygonal pattern such as triangular, rectangular, rhombus, hexagonal pattern, or any other regularly arranged patterns.

The graphene layer 12 may be coated on the conductive thin film 11 through various physical or chemical methods. For example, the graphene layer 12 may be formed by using a vapor deposition method to have a uniform surface. The vapor deposition method may be a physical vapor deposition (PVD) or a chemical vapor deposition (CVD), and any vapor deposition method may be used to form the graphene layer 12.

In some embodiments, the graphene layer 12 may have a thickness of 200 nm or less. When the graphene layer 12 is a monolayer graphene sheet having a thickness of a few nm, the thickness of the graphene layer 12 is equal to the diameter of a carbon atom. In other embodiments, the graphene layer 12 may be formed of few or dozens of graphene sheets layered on top of one another. In this case, the thickness of the graphene layer 12 may not exceed 200 nm because when the graphene layer 12 is too thick, electrical conductivity may be limited to a certain extent. The thickness of the graphene layer 12 may be from about 1 nm to about 500 nm, for example, about 10 nm to about 450 nm, or from about 100 nm to about 400 nm.

The electron collector structure described above may be used in an electrode of a lithium battery to increase the electrical conductivity of an electrode plate and may contribute to the improvement of the energy consumption and lifespan characteristics of the lithium battery.

One or more embodiments provide an electrode for a lithium battery, the electrode including the above-described electron collector structure; and an electrode active material layer disposed on the graphene layer.

The electron collector structure is the same as described above, and thus, detailed descriptions of the electron collector structure will be omitted.

As shown in FIG. 2, the electrode active material layer 20 may be disposed on the graphene layer 12 having an electron collector structure and the electrode active material layer 20 may be any layer that is generally used in the art. The electrode active material layer 20 may include an electrode active material, a binder, and optionally, a conductive material, and various additives may be included according to the need.

The electrode may be used in a positive electrode, negative electrode, or both of a lithium battery.

When the electrode is used as the positive electrode of the lithium battery, the electrode active material layer 20 may include a positive active material, a conductive material, and a binder.

The positive active material is a lithium-containing metal oxide, and any material that is generally used in the art may be used. For example, the positive active material can be one or more compounds that enable intercalation and deintercalation of lithium ions such as $LiCoO_2$, $LiNiO_2$, $LiMnO_2$, $LiMn_2O_4$, $Li(Ni_aCo_bMn_c)O_2$, wherein $0<a<1$, $0<b<1$, $0<c<1$, and $a+b+c=1$, $LiNi_{1-Y}CoYO_2$, $LiCo_{1-Y}MnYO_2$, $LiNi_{1-Y}MnYO_2$, wherein $0\le Y<1$, $Li(Ni_aCo_bMn_c)O_4$, wherein $0<a<2$, $0<b<2$, $0<c<2$, and $a+b+c=2$, $LiMn_{2-z}Ni_zO_4$, $LiMn_{2-z}Co_zO_4$, wherein $0<Z<2$, $LiCoPO_4$, and $LiFePO_4$. The positive active material may be used alone or as a mixture of two or more of the positive active materials.

In some embodiments, the conductive material is used to provide a conductive pathway to the positive active material to increase the electrical conductivity thereof, and any material that is generally used in a lithium battery may be used. The conductive material may be a conductive material, which may be a carbonaceous material such as carbon black, acetylene black, ketjen black, and carbon fiber (for example, vapor grown carbon fiber); a metallic material such as a metal powder or a metal fiber of copper, nickel, aluminum, and silver; a conductive polymer such as a polyphenylene derivative, or a mixture thereof. The amount of the conductive material may be adjusted. For example, the conductive material may be added in an amount such that a weight ratio of the negative active material to the conductive material is in a range of about 99:1 to about 90:10.

In some embodiments, the binder is included as a component that facilitates bonding between the positive active material and the conductive material and bonding between the electrode active material layer and the electron collector structure. Suitable examples of the binder include but are not limited to polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenolic resin, epoxy resin, polyethylene terephthalate, polytetrafluoroethylene, polyphenyl sulfide, polyamide imide, polyetherimide, polyethylene sulfone, polyamide, polyacetal, polyphenylene oxide, polybutylene terephthalate, ethylene-propylene-diene terpolymer (EPDM), sulfonated EPDM, styrene-butadiene rubber, fluoro rubber, and various copolymers. The binder may be added in an amount of about 1 part by weight to about 50 parts by weight based on 100 parts by weight of the positive active material. For example, the binder may be added in an amount of about 1 part by weight to about 30 parts by weight, about 1 part by weight to about 20 parts by weight, or about 1 part by weight to about 15 parts by weight based on 100 parts by weight of the positive active material.

In some embodiments, the positive electrode may be prepared by, for example, mixing the above-described positive active material, the conductive material, and the binder in a solvent to prepare a positive active material composition; the formed composition is then directly coated on the electron collector structure to prepare a positive electrode plate, or may be casted on a separate support, so that a positive active material film peeled-off from the support may be laminated on the electron collector structure to obtain a positive electrode plate. The positive electrode is not limited to the forms listed above.

The solvent in the positive active material composition may be N-methylpyrrolidone, acetone, water, or the like. The amount of the solvent is about 1 part by weight to about 10 parts by weight based on 100 parts by weight of the positive active material. When the amount of the solvent is within the range above, a process for forming an active material layer is easy.

When the electrode is used as a negative electrode of a lithium battery, the electrode active material layer 20 may include a negative active material, a binder. In some embodiments, the electrode active material layer 20 may optionally include a conductive material.

The negative active material may be anything that is generally used in the art. Non-limiting examples of the negative active material include but are not limited to a lithium metal, a metal that is alloyable with lithium, a transition metal oxide, a material that is capable of doping and undoping lithium, and a material that enables a reversible intercalation and deintercalation of lithium ions.

Non-limiting examples of the transition metal include a tungsten oxide, a molybdenum oxide, a titanium oxide, a lithium titanium oxide, a vanadium oxide, and a lithium vanadium oxide.

The materials that enable doping and undoping lithium include Si; $SiOx(0<x\le 2)$; Si—Y alloy wherein Y is an alkali metal, an alkaline earth metal, a Group 13 element, a Group 14 element, a transition metal, a rare earth element, or a combination element thereof, except Si; Sn; $SnO2$; and Sn—Y wherein Y is an alkali metal, an alkaline earth metal, a Group 13 element, a Group 14 element, a transition metal, a rare earth element, or a combination element thereof, except Sn; and a mixture of at least one of these and $SiO2$ may be used. The element Y may be magnesium (Mg), calcium (Ca), strontium (Sr), barium (Ba), radium (Ra), scandinavium (Sc), yttrium (Y), titanium (Ti), zirconium (Zr), halfnium (Hf), rutherfordium (Rf), vanadium (V), niobium (Nb), tantalum (Ta), dubnium (Db), chromium (Cr), molybdenum (Mo), tungsten (W), seaborgium (Sg), techtenium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), pollonium (Po), or a combination thereof.

In some embodiments, a material that enables a reverse intercalation and deintercalation of lithium ions may be a carbonaceous material and may be any carbonaceous negative active material generally used in a lithium battery. Examples of the material include but are not limited to a crystalloid carbon, an amorphous carbon, or a mixture thereof. Non-limiting examples of the crystalloid carbon include natural graphite having an amorphous form, a flat form, a flake form, a spherical form, or a fiber form; or artificial graphite. Non-limiting examples of the amorphous carbon include a soft carbon (a low temperature calcined carbon), a hard carbon, a mesophase pitch carbide, and calcined cokes.

A conductive material and a binder used for the negative electrode may be the same as those used in the electrode active material layer of the positive electrode. A plasticizer may be further added to the positive electrode or the negative electrode to form holes in the electrode plate depending on the case. The negative active material, the conductive material, and the binder in the negative electrode have an amount that is generally used in a lithium battery.

In some embodiments, a negative active material composition in which a negative active material, a binder, a solvent and selectively, a conductive material are mixed is prepared, and then the negative active material composition is directly coated and dried on the electron collector structure to prepare a negative electrode plate. In other embodiments, the negative active material composition is casted on a separate support, so that a film peeled off from the support may be laminated on the electron collector structure to prepare the negative electrode plate.

When the electron collector structure is included only in one of the positive electrode and the negative electrode, the other electrode may be an electron collector that is generally used in the art such as a conductive thin film.

The electron collector structure may improve the electrical conductivity of the electrode plate, and thus, may be included in both of the positive electrode and the negative electrode. The electron collector structure may be more efficient when the electron collector structure is included in the positive electrode that uses a positive active material, which has comparatively lower electrical conductivity than the negative electrode.

In some embodiments, a lithium battery can include a positive electrode; a negative electrode disposed opposite to the positive electrode; and an electrolyte disposed between the positive electrode and the negative electrode, wherein at least one of the positive electrode and the negative electrode includes the above-described electron collector structure.

The positive electrode and the negative electrode are as described above.

The positive electrode and the negative electrode may be separated by a separator. The separator may be any separator that is generally used in a lithium battery. In particular, a separator that has low resistance with respect to the mobility of ions of an electrolyte while having excellent moisturization capability of an electrolyte solution is suitable. For example, a material for the separator may be selected from the group consisting of a glass fiber, polyester, Teflon, polyethylene, polypropylene, polytetrafluoroethylene (PTFE), and a combination thereof, and the material may have a non-woven fabric form or a woven fabric form. In some embodiments, a separator that has holes with a diameter of about 0.01 µm to about 10 µm and has a thickness of about 5 µm to about 300 µm may be used.

A lithium-salt having a non-aqueous electrolyte solution can include a non-aqueous electrolyte and lithium. The non-aqueous electrolyte may be a non-aqueous electrolyte solution, a solid electrolyte, or an inorganic solid electrolyte.

For example, an aprotic organic solvent used as the non-aqueous electrolyte solution can include N-methyl-2-pyrrolidinone, propylene carbonate, ethylene carbonate, butylene carbonate, dimethyl carbonate, diethyl carbonate, fluoride ethylene carbonate, ethylene methylene carbonate, methyl propyl carbonate, ethyl propanoate, methyl acetate, ethyl acetate, propyl acetate, dimethylacetate gamma-butyrolactone, 1,2-dimethoxyethane, tetrahydrofuran, 2-methyl tetrahydrofuran, dimethyl sulfoxide, 1,3-dioxolane, formamide, dimethyl formamide, dioxolane, acetonitrile, nitromethane, methyl formate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

For example, polyethylene derivatives, polyethylene oxide derivatives, polypropylene oxide derivatives, a phosphoric acid ester polymer, a poly agitation lysine, a polyester sulfide, a polyvinyl alcohol, a polyvinylidene fluoride, or a polymer containing an ionic dissociation group may be used as the organic solid electrolyte.

As the inorganic solid electrolyte, for example, a nitride, a halogenide, or a sulfate of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$, may be used.

Any lithium salt generally used in a lithium battery may be used as the lithium salt, and also a material that is capable of being thoroughly dissolved in the non-aqueous electrolyte, such as at least one material of LiCl, LiBr, LiI, $LiClO_4$, $LiBF_4$, $LiB_{10}Cl_{10}$, LiPF6, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium-chloro-borate, lithium lower aliphatic carboxylic acid, tetraphenyl borate lithium, or imide may be used as the lithium salt.

Lithium batteries may be classified into lithium ion batteries, lithium ion polymer batteries, and lithium polymer batteries depending on the type of separator and electrolyte used. They may also be classified into cylindrical shape batteries, rectangular shape batteries, coin shape batteries, and pouch shape batteries depending on their shape, and into bulk type batteries and thin film type batteries depending on their size. The lithium battery may be a lithium first battery or a lithium secondary battery.

Methods of manufacturing the batteries are well known in the art, and thus, detailed descriptions thereof will be omitted.

Figure 3:
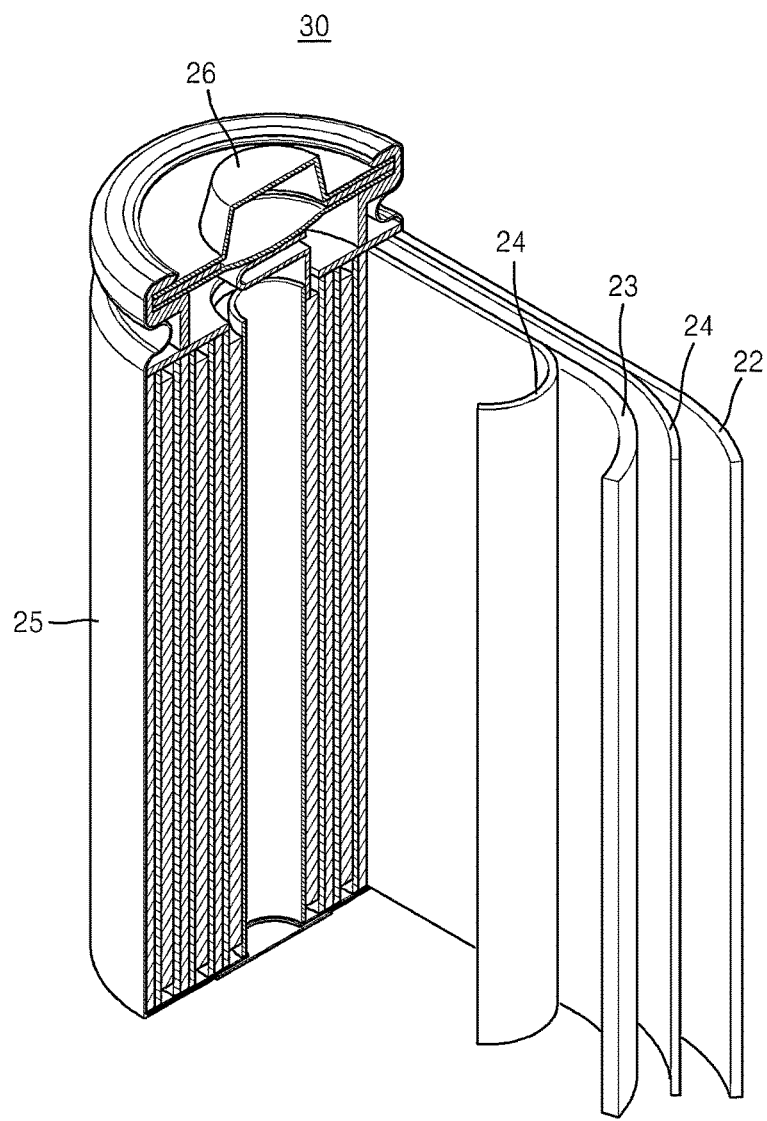
FIG. 3 is a schematic view of a structure of a lithium battery.

FIG. 3 is a schematic view illustrating a representative structure of a lithium battery 30.

Referring to FIG. 3, the lithium battery 30 includes a positive electrode 23, a negative electrode 22, and a separator 24 disposed between the positive electrode 23 and the negative electrode 22. The positive electrode 23, the negative electrode 22, and the separator 24 may be wound or folded to be enclosed in a battery case 25. Then, an electrolyte is injected into the battery case 25, which is then sealed by using a sealing member 26 to complete the lithium battery 30. The battery case 25 may have a cylindrical shape, a rectangular shape, a thin film shape, or the like. The lithium battery may be a lithium ion battery.

The lithium battery is suitable for applications that require high capacity, high output, and high temperature drive, such as electric vehicles, conventional mobile phones, portable computers, and the like. Also, the lithium battery may be coupled to a conventional internal combustion engine, a fuel cell, or a supercapacitor, to be used in a hybrid vehicle. In addition, the lithium battery may be used for other applications that require high output, high voltage, and high temperature drive.

Hereinafter, exemplary embodiments will be described in greater detail through Examples and Comparative Examples. However, the Examples are for illustrative purposes only and the scope is not limited thereto.

Preparation of a Positive Electrode Plate

EXAMPLE 1

First, to synthesize a graphene sheet, 100 g of expandable graphite were heated at a temperature of 500° C. in an oven for 1 hour, and after expansion thereof gas generated therefrom was vented through an exhaust pipe of the oven. Then, the obtained resultant was dispersed in ethanol, and then pulverized by using a homogenizer at a speed of 10,000 rpm for 10 minutes. The obtained mixture was further pulverized by using a micro fluidizer, filtered by using a filtering device, and then washed with ethanol, and the resultant was then dried in the oven at a temperature of 120° C. to obtain a graphene sheet.

The obtained graphene sheet and a binder were mixed in a weight ratio of 1:1 and then N-methyl-2-pyrrolidone was added thereto until the solid content thereof reached 60 wt % in order to adjust the viscosity of the mixture and to prepare a coating slurry.

After adhering a tape in a rectangular shape to coat the graphene layer on an area of 50% of the total area of the surface of an aluminum foil electron current collector, as illustrated in FIG. 1, the coating slurry was coated thereon in a thickness of 10 µm, and then dried at a temperature of 110° C. for 15 minutes to complete the electron collector structure.

Meanwhile, a nickel cobalt aluminum oxide ($LiNi_{0.8}Co_{0.15}Al_{0.05}O_2$) powder as a positive active material, polyvinylidene fluoride as a binder, and an acetylene black powder as a conductive material were dispersed in a weight ratio of 96:2:2 in an N-methylpyrrolidone solvent to prepare a positive electrode slurry. The positive electrode slurry was coated in a thickness of 60 µm on the electron collector structure to form a positive active material layer, which was then dried at a temperature of 135° C. for 3 hours or more, and then roll-pressed to prepare a positive electrode plate.

COMPARATIVE EXAMPLE 1

A positive electrode plate was prepared by using the same processes as described in Example 1 above, except that the graphene layer was not coated on the aluminum foil.

COMPARATIVE EXAMPLE 2

A positive electrode plate was prepared by using the same processes as described in Example 1 above, except that the entire surface of the aluminum foil was coated with the graphene layer.

EVALUATION EXAMPLE 1

Observation of the Surface State of a Positive Electrode

Figure 4:
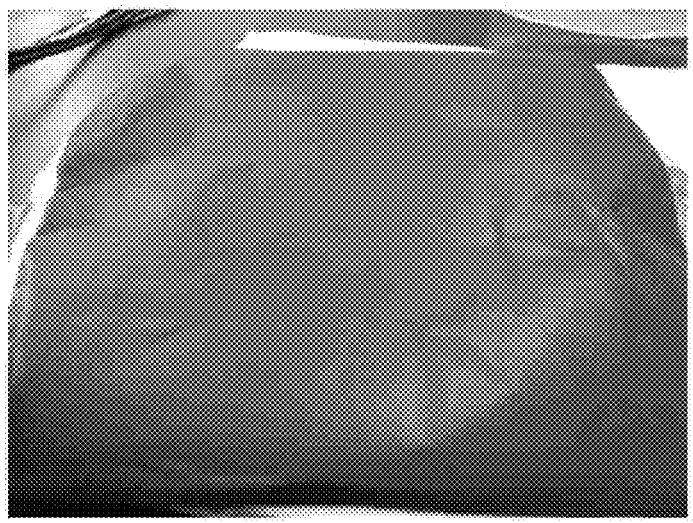
FIG. 4 is an image showing the surface state of the positive electrode prepared in Example 1.
Figure 5:
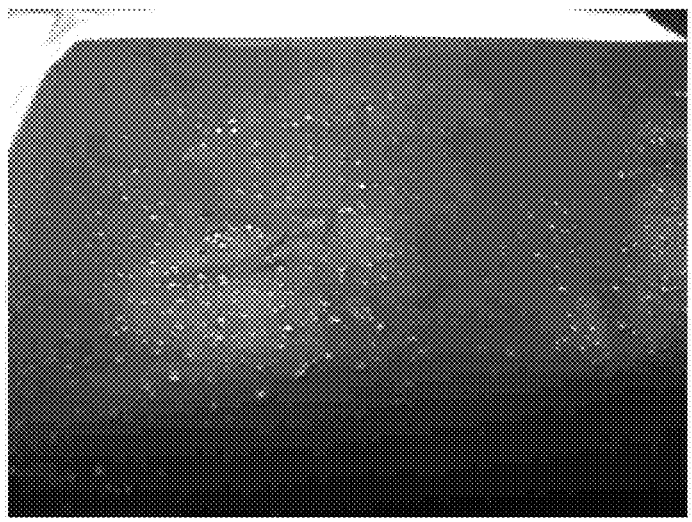
FIG. 5 is an image showing the surface state of the positive electrode prepared in Comparative Example 3.

Images of the surface states of the positive electrode plates prepared in Example 1 and Comparative Example 2 above are shown in FIGS. 4 and 5 respectively.

As shown in FIG. 4, the positive electrode prepared in Example 1 showed a good bonding strength between the graphene layer and the positive active material layer, and accordingly, the final coating state of the positive electrode plate was very uniform and good.

On the contrary, when the graphene layer was coated entirely on the aluminum foil, the bonding strength between the graphene layer and the positive active material layer was weak, which caused entrance of holes therebetween. As a result, the final coating state of the positive electrode plate was irregular, as shown in FIG. 5. When the irregular positive electrode plate is wound and pressed to manufacture a battery, stability problems such as a short circuit may occur, and thus, the positive electrode plate of Comparative Example 3 is not applicable to a lithium battery.

EVALUATION EXAMPLE 2

Measurement of the Electrical Conductivity of an Electron Collector Structure

The electrical conductivities of the positive electrode plates used in Example 1 and Comparative Examples 1 and 2 were measured by using an electrical conductivity measuring device (MCP-PD51, available from Mitsubishi Chemicals Co., Tokyo, Japan), and the measurement results are shown in Table 1 below.

TABLE 1

| | Example 1 | Comparative Example 1 | Comparative Example 1 |
|---|---|---|---|
| Electrical conductivity (S/cm) | $4.2 \times 10^{-2}$ | $9.11 \times 10^{-3}$ | $9.1 \times 10^{-2}$ |

As shown in Table 1, in Example 1 (the electron collector included the aluminum foil with the graphene layer coated thereon), the electrical conductivity of the positive electron plate was about 4.6 times as great as that of Comparative Example 1 (no graphene layer was coated on the aluminum foil of the electron collector).

Meanwhile, in Comparative Example 2 (the entire aluminum foil of the electron collector was coated with the graphene layer), the electrical conductivity of the positive electrode plate was higher than those of the electron collector having the aluminum foil with no graphene layer coated thereon and the electron collector having the graphene layer coated with the aluminum foil on about 50% thereof. However, the coating state of the positive electrode plate was very poor as described above, and thus, the positive electrode plate is not applicable to a lithium battery.

As described above, according to the one or more of the above embodiments, an electron collector structure may improve the electrical conductivity of an electrode plate. When an electrode for a lithium battery includes the electron collector structure according to the one or more of the above embodiments, the electrical conductivity of the electrode may be improved, thereby improving the Joule properties as well as the lifespan characteristics of the lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. An electron collector structure, comprising:
a conductive thin film; and
a graphene layer consisting of one or more graphene sheets, the graphene layer partially coated on a top surface of the conductive thin film such that a portion of the conductive thin film is not coated by the graphene layer, and
an electrode active material layer disposed on the graphene layer and directly contacting the portion of the conductive thin film that is not coated by the graphene layer;
wherein the graphene layer is coated on an area in the range of about 50% or less of the top surface of the conductive thin film, and wherein the thickness of the graphene layer is less than 200 nm.

2. The electron collector structure of claim 1, wherein the graphene layer is coated on an area in the range of from about 10% to about 50% of the top surface of the conductive thin film.

3. The electron collector structure of claim 1, wherein the graphene layer has a regular arrangement of a checkered pattern, a plaid pattern, a circular pattern, or a polygonal pattern.

4. The electron collector structure of claim 1, wherein the conductive thin film comprises at least one material selected from the group consisting of aluminum, copper, nickel, titanium, stainless steel, and any combinations thereof.

5. The electron collector structure of claim 1, wherein the conductive thin film has at least one form selected from the group consisting of a film, a sheet, a foil, a net, a porous body, foam, a non-woven fabric, and any combinations thereof.

6. The electron collector structure of claim 1, wherein the top surface of the conductive thin film has an uneven structure.

7. An electrode for a lithium battery, the electrode comprising:
the electron collector structure according to claim 1.

8. The electrode of claim 7, wherein the electrode is a positive electrode.

9. The electrode of claim 8, wherein the active material layer comprises at least one positive active material selected from the group consisting of $LiCoO_2$; $LiNiO_2$; $LiMnO_2$; $LiMn_2O_4$; $Li(Ni_aCo_bMn_c)O_2$, wherein $0<a<1$, $0<b<1$, $0<c<1$, and $a+b+c=1$; $LiNi_{1-y}Co_yO_2$; $LiCo_{1-y}Mn_yO_2$; $LiNi_{1-y}Mn_yO_2$ wherein $0\leq Y<1$; $Li(Ni_aCo_bMn_c)O_4$, wherein $0<a<2$, $0<b<2$, $0<c<2$, and $a+b+c=2$; $LiMn_{2-z}Ni_zO_4$, $LiMn_{2-z}Co_zO_4$, wherein $0<Z<2$; $LiCoPO_4$, and $LiFePO_4$.

10. A lithium battery, comprising:
a positive electrode;
a negative electrode disposed opposite to the positive electrode; and
an electrolyte disposed between the positive electrode and the negative electrode, wherein at least one of the positive electrode and the negative electrode comprises the electron collector structure according to claim 1.

11. The battery of claim 10, wherein electron collector structure comprises a graphene layer, and wherein the graphene layer is coated on an area in the range of from about 10% to about 50% of the top surface of the conductive thin film.

12. The battery of claim 10, wherein electron collector structure comprises a graphene layer, and wherein the graphene layer has a regular arrangement of a checkered pattern, a plaid pattern, a circular pattern, or a polygonal pattern.

13. The battery of claim 10, wherein electron collector structure comprises a graphene layer, and wherein the thickness of the graphene layer is greater than 1 nm and less than 200 nm.

14. The battery of claim 10, wherein electron collector structure comprises a conductive thin film, and wherein the conductive thin film comprises at least one material selected form the group consisting of aluminum, copper, nickel, titanium, stainless steel, and any combinations thereof.

15. The battery of claim 10, wherein electron collector structure comprises a conductive thin film, and wherein the conductive thin film has at least one form selected from the group consisting of a film, a sheet, a foil, a net, a porous body, foam, a non-woven fabric, and any combinations thereof.

* * * * *